United States Patent [19]

Schuler et al.

[11] Patent Number: 5,303,893
[45] Date of Patent: Apr. 19, 1994

[54] ROTARY COUPLING FOR CONNECTING A CONTROL DEVICE HOUSING TO A SUPPORT ARM OR AN ELBOW

[75] Inventors: Matthias Schuler, Dietzholztal; Udo Munch, Sinn; Wolfgang Reuter, Burbach, all of Fed. Rep. of Germany

[73] Assignee: Rittal-Werk Rudolf Loh GmbH & Co. KG, Fed. Rep. of Germany

[21] Appl. No.: 897,462

[22] Filed: Jun. 11, 1992

[30] Foreign Application Priority Data

Jun. 13, 1991 [DE] Fed. Rep. of Germany ....... 4119508

[51] Int. Cl.$^5$ ............................................... A47F 5/00
[52] U.S. Cl. .................................. 248/288.5; 285/184
[58] Field of Search ................. 285/282, 184; 248/181, 248/288.5

[56] References Cited

U.S. PATENT DOCUMENTS

| | | | |
|---|---|---|---|
| 357,299 | 2/1887 | Wright | 248/181 |
| 3,059,948 | 10/1962 | Thompson et al. | 248/288.5 X |
| 3,338,545 | 8/1967 | Magi | 248/181 X |
| 3,957,291 | 5/1976 | Edling et al. | 285/282 X |
| 4,765,580 | 8/1988 | Wright | 248/181 |

FOREIGN PATENT DOCUMENTS

| | | |
|---|---|---|
| 1762728 | 1/1958 | Fed. Rep. of Germany . |
| 8626910 | 1/1987 | Fed. Rep. of Germany . |
| 4033747 | 4/1992 | Fed. Rep. of Germany . |

Primary Examiner—Dave W. Arola
Attorney, Agent, or Firm—Speckman, Pauley & Fejer

[57] ABSTRACT

A rotary coupling for connecting a control device housing to a support arm or an elbow of a support arm system, having a rotating ring fixedly connected to the control device housing and partially rotatable in relation to a coupling piece which is connected to the support arm or the elbow. For equalization of tolerances caused by insufficient twist rigidity of the support arm system, the invention provides that the coupling piece forms a peripheral bearing ring which is convexly arched outwardly and is received in and supported by two shell rings. The shell rings are connected to each other and have concavely arched bearing surfaces. The shell rings are rigidly mounted on the bearing ring of the coupling piece by a clamping cheek. The rotating ring is rotatably maintained on the shell rings by a support ring which is connected to the shell rings.

20 Claims, 1 Drawing Sheet

ROTARY COUPLING FOR CONNECTING A CONTROL DEVICE HOUSING TO A SUPPORT ARM OR AN ELBOW

BACKGROUND OF THE INVENTION

1. Field of the Invention

This invention relates to a rotary coupling for connecting a control device housing to a support arm or an elbow of a support arm system, said rotary coupling comprising a rotating ring fixedly connected to the control device housing and partially rotatable in relation to a coupling piece connected to the support arm or the elbow.

2. Description of Prior Art

Such a rotary coupling is known from German Patent Disclosure P 40 33 747.2. This known rotary coupling permits pivoting of the control device housing around a vertical pivot axis. The selected pivot position can also be locked in. Pivoting is limited to 360°, since supply lines are fed through the rotary coupling.

The disadvantage of such rotary couplings is that the pivot axis no longer extends vertically because of insufficient twist rigidity of the support arm system, particularly with heavy control devices. The result is that the control device housing takes up a more or less canted position which, depending on the pivot direction, also is additionally upwardly changed.

SUMMARY OF THE INVENTION

It is an object of this invention to provide a rotary coupling of the above mentioned type where the pivot position is vertically oriented in every pivoted position of the control device housing and where the selected position can be sufficiently securely locked in so that it does not change due to additional forces acting in any arbitrary direction on the control device housing.

This object is attained in accordance with one embodiment of this invention in which a coupling piece having a peripheral bearing ring which is convexly arched outwardly is received in and supported by two shell rings. The shell rings are connected to each other and have concavely arched interior bearing surfaces. The shell rings are rigidly mounted on the bearing ring of the coupling piece by a clamping cheek. A rotating ring is rotatably maintained on the shell rings by a support ring which is connected to the shell rings.

Regardless of the pivot position, the bearing ring of the coupling piece can always be moved sufficiently in the connected shell rings so that the pivot axis is oriented exactly vertically. Locking in place is performed by a clamping cheek between one of the shell rings and the bearing ring and therefore is absolutely secure and vastly superior to a ball joint bearing.

Mounting of the rotary coupling with easy-to-produce parts is made easier in that the connecting plane of the two shell rings coincides with the largest peripheral diameter of the bearing ring, the bearing surfaces of the shell rings extend over the entire peripherally convexly arched bearing ring, and the two shell rings and the support ring are connected to each other by common screw connections.

Locking in place is simplified in that the clamping cheek can be adjusted by a tightening screw which is adjustable in a threaded receptacle of one shell ring, and the tightening screw is provided with a stop plate and a manual lever at the periphery of the shell ring.

Limiting the pivot movement of the rotating ring is accomplished by providing the coupling piece with a stop which, together with a stop pin of the rotating ring, limits the rotary movement of the rotating ring to 360°.

In accordance with one embodiment of this invention, the pivotable locking of the rotating ring is provided by the rotating ring having an exterior flange which is maintained on the shell rings by an interior flange of the support ring.

In accordance with another embodiment of this invention, the exterior flange of the rotating ring is supported by a first slide ring on the shell rings and by a second slide ring on the interior flange of the support ring. The control device housing can thus be suspended from or placed on the rotary coupling without pivotability being hampered because one slide ring is always operative.

The pivot movement of the control device housing is also not hampered, in accordance with another embodiment of this invention, where the rotating ring slightly extends beyond the support ring and is directly connected to the control device housing.

BRIEF DESCRIPTION OF THE DRAWINGS

The invention will be described in detail by means of an exemplary embodiment illustrated in the drawings, wherein.

DESCRIPTION OF PREFERRED EMBODIMENTS

Figure 1:
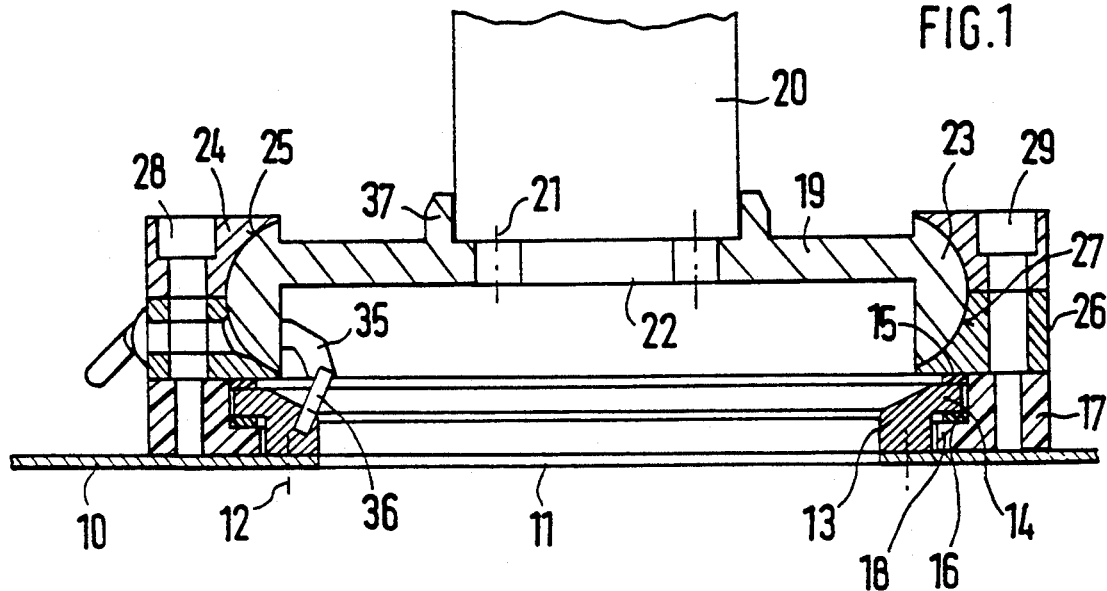
FIG. 1 is a cross-sectional view of the rotary coupling in accordance with one embodiment of this invention.
Figure 2:
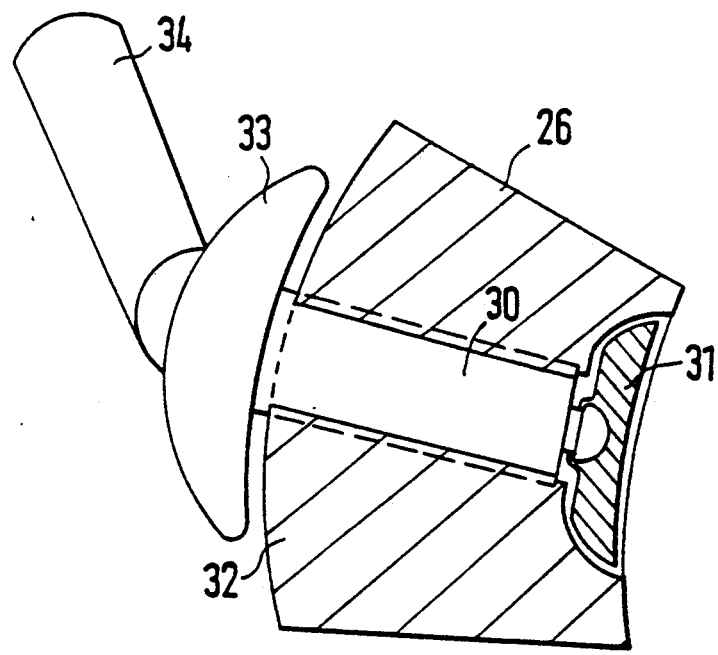
FIG. 2 is an enlarged partial sectional view of the clamping cheek in a shell ring.

As shown in FIG. 1, the rotary coupling in accordance with one embodiment of this invention is screwed to the front of a vertically oriented support arm or of an elbow, as indicated by the screw connections 21 on the coupling piece 19. Guide flanges 37 are formed on the coupling piece 19 and assure the correct connecting position. The coupling piece 19 has a cutout 22 for running supply lines.

The coupling piece 19 terminates in a peripheral bearing ring 23 which is convexly arched outwardly, the maximum peripheral diameter of the bearing ring 23 being approximately at the center of the arch. This bearing ring 23 is received by two shell rings 24 and 26 and is maintained pivotable by them. The connecting plane of the two shell rings 24 and 26 coincides with the maximum peripheral diameter of the bearing ring 23. The screw connections 28 and 29 not only connect the two shell rings 24 and 26 to each other, but also they fasten a support ring 17 to the shell rings 24 and 26. This support ring 17 rotatably fixes a rotating ring 13 on the shell rings 24 and 26. A circumferential interior flange 18 of the support ring 17 grips a circumferential exterior flange 14 of the rotating ring 13 from behind. The circumferential exterior flange 14 of the rotating ring 13 is supported by a slide ring 15 on the shell ring 26 and by a further slide ring 16 on the circumferential interior flange 18 of the support ring 17. In this way, friction during pivoting of the rotating ring 13 is maintained low, regardless of whether the rotary coupling is stressed by a suspended control device housing 10 or by one placed on top of it. The rotating ring 13 and the support ring 17 have a circumferential exterior flange 14 or a circumferential interior flange 18, so that guidance is assured over the entire circumference of the rotary coupling. The rotary movement of the rotating ring 13 is limited to 360°. For this purpose, a stop 35 is disposed on the inside of the bearing ring 23 and a stop pin 36 on the rotating ring 13 in such a way that they are in operative connection with each other in a plane which is parallel to the rotating ring 13.

The control device housing 10 has a cutout 11 for the supply lines. The rotating ring 13 is screwed together with the control device housing 10 around this cutout 11, as indicated by the screw connections 12.

Because the support arm system does not have absolute rigidity and because the connecting surface of the support arm 20 or of the elbow is not always horizontally oriented because of twisting, it is possible to make an adjustment by the rotary coupling so that the rotating ring 13 and the control device housing 10 connected to it are horizontally oriented in every pivot position. To this end, the shell rings 24 and 26, which are connected to each other, are pivoted on the bearing ring 23 in such a way that the rotating ring 13 maintained by the support ring 17 is horizontally oriented. Then the shell rings 24 and 26 are locked against the bearing ring 23. A clamping cheek 31 which is housed in one shell ring 26 or 24, and is adjustable by a tightening screw 30, is used for this purpose. The tightening screw 30 is screwed into a threaded receptacle 32 of the shell ring 26.

Operation of the tightening screw 30 is performed by a manual lever 34 which is disposed outside of the shell ring 26 on the tightening screw 30, together with a stop plate 33. After loosening the clamping cheek 31, which is clamped to the bearing ring 23, it is possible to provide a new setting of the rotating ring 13. The pivot range of the shell rings 24 and 26 on the bearing ring 23 is sufficient, because the support arm system does not require large adjustment.

It is also possible to lock the shell rings 24 and 26 to the bearing ring 23 by different means.

However, with a control device housing 10 placed on the rotary coupling which is turned by 180°, the slide ring 16 can be omitted.

If the rotary coupling is used for a suspended control device housing 10, the slide ring 15 can be omitted. In this case the support ring 17 with the circumferential interior flange 18 can also be made of one piece with the shell ring 26.

We claim:

1. In a rotary coupling for connecting a control device housing to one of a support arm and an elbow of a support arm system, said rotary coupling having a rotating ring fixedly connected to the control device housing and partially rotatable in relation to a coupling piece which is connected to one of the support arm and the elbow, the improvement comprising:
   a coupling piece (19) having a peripheral bearing ring (23) with a convexly arched outwardly outer bearing surface, two shell rings (24, 26) with concavely arched inner bearing surfaces (25,27) adapted to receive and support said bearing ring, said shell rings (24, 26) connected to each other by connecting means;
   the shell rings (24, 26) adjustably mounted on the bearing ring (23) of the coupling piece (19) by a clamping cheek means (31); and
   a support ring (17) connected to the shell rings (24,26), the rotating ring (13) rotatably maintained on the shell rings (24, 26) by coacting means between said shell rings and said support ring (17).

2. In a rotary coupling in accordance with claim 1, wherein
   the contact between a surface of each shell ring (24, 26) defines a connecting plane, the connecting plane coincides with a largest exterior diameter of the bearing rings (23), and
   the bearing surfaces (25, 27) of the shell rings (24, 26) extend over the entire peripherally convexly arched bearing ring (23).

3. In a rotary coupling in accordance with claim 2, wherein
   the clamping cheek means (31) is connected to a tightening screw (30) which is disposed in a threaded receptacle (32) of one of said shell rings.

4. In a rotary coupling in accordance with claim 3, wherein
   the coupling piece (19) comprises a stop (35) and the rotating ring (13) comprises a stop pin (36) which contacts the stop (35) whereby the rotary movement of the rotating ring (13) is limited to 360°.

5. In a rotary coupling in accordance with claim 4, wherein said coacting means includes
   the rotating ring (13) having a peripheral flange (14) which overlaps an interior flange (18) of the support ring (17).

6. In a rotary coupling in accordance with claim 5, wherein
   the peripheral flange (14) of the rotating ring (13) is positioned between and contacts a first slide ring (15) on the shell rings (24, 26) and by a second slide ring (16) on the interior flange (18) of the support ring (17).

7. In a rotary coupling in accordance with claim 6, wherein
   the shell rings (24, 26) and the support ring (17) are connected to each other by at least one screw connection (28, 29).

8. In a rotary coupling in accordance with claim 7, wherein
   the rotating ring (13) extends towards said control device housing (10) beyond the support ring (17) and is directly connected to the control device housing (10).

9. In a rotary coupling in accordance with claim 8, wherein
   the tightening screw (30) comprises a stop plate (33) and a manual lever (34), said stop plate (33) disposed at the periphery of one of the shell rings (24, 26) and said manual lever (34) connected to said stop plate.

10. In a rotary coupling in accordance with claim 9, wherein
    the contact between a surface of each shell ring (24, 26) defines a connecting plane, and the bearing ring (23) is symmetrical in relation to the connecting plane, and
    the bearing surfaces (25, 27) of the shell rings (24, 26) extend over respectively one-half of said convex peripheral surface of the bearing ring (23).

11. In a rotary coupling in accordance with claim 10, wherein
    said coacting means includes comprises an interior flange (18) on the support ring.

12. In a rotary coupling in accordance with claim 1, wherein the clamping cheek means (31) is connected to a tightening screw (30) which is disposed in a threaded receptacle (32) of one of said shell rings.

13. In a rotary coupling in accordance with claim 12, wherein
the tightening screw (30) comprises a stop plate (33) and a manual lever (34), said stop plate (33) disposed at the periphery of one of the shell rings (24, 26) and said manual lever (34) connected to said stop plate.

14. In a rotary coupling in accordance with claim 1, wherein
the coupling piece (19) comprises a stop (35) and the rotating ring (13) comprises a stop pin (36) which contacts the stop (35) whereby the rotary movement of the rotating ring (13) is limited to 360°.

15. In a rotary coupling in accordance with claim 1, wherein said coacting means includes
the rotating ring (13) having a peripheral flange (14) which overlaps an interior flange (18) of the support ring (17).

16. In a rotary coupling in accordance with claim 15, wherein
the peripheral flange (14) of the rotating ring (13) is positioned between and contacts a first slide ring (15) on the shell rings (24, 26) and by a second slide ring (16) on the interior flange (18) of the support ring (17).

17. In a rotary coupling in accordance with claim 1, wherein
the shell rings (24, 26) and the support ring (17) are connected to each other by at least one screw connection (28, 29).

18. In a rotary coupling in accordance with claim 1, wherein
the rotating ring (13) extends towards said control device housing (10) beyond the support ring (17) and is directly connected to the control device housing (10).

19. In a rotary coupling in accordance with claim 1, wherein
the contact between a surface of each shell ring (24, 26) defines a connecting plane, the bearing ring (23) is symmetrical in relation to the connecting plane, and
the bearing surfaces (25, 27) of the shell rings (24, 26) extend over respectively one-half of said convex peripheral surface of the bearing ring (23).

20. In a rotary coupling in accordance with claim 1, wherein
said coacting means comprises an interior flange (18) on the supporting ring.

* * * * *